(12) United States Patent
Nam

(10) Patent No.: US 9,600,695 B2
(45) Date of Patent: Mar. 21, 2017

(54) APPARATUS AND METHOD FOR PROVIDING DATA TRANSMISSION/RECEPTION IN A TERMINAL USING NEAR FIELD COMMUNICATION

(71) Applicant: Samsung Electronics Co., Ltd., Gyeonggi-do (KR)

(72) Inventor: Sang-Su Nam, Seoul (KR)

(73) Assignee: Samsung Electronic Co., Ltd., Yeongtong-gu, Suwon-si, Gyeonggi-do (KR)

(*) Notice: Subject to any disclaimer, the term of this patent is extended or adjusted under 35 U.S.C. 154(b) by 304 days.

(21) Appl. No.: 14/026,535

(22) Filed: Sep. 13, 2013

(65) Prior Publication Data

US 2014/0077935 A1   Mar. 20, 2014

(30) Foreign Application Priority Data

Sep. 14, 2012 (KR) .................. 10-2012-0102103

(51) Int. Cl.
G06K 7/00 (2006.01)
H04B 5/00 (2006.01)
H04M 1/725 (2006.01)

(52) U.S. Cl.
CPC ......... *G06K 7/0008* (2013.01); *H04B 5/0031* (2013.01); *H04M 1/7253* (2013.01); *H04M 2250/04* (2013.01)

(58) Field of Classification Search
CPC . G06K 7/0008; H04B 5/0031; H04M 1/7253; H04M 2250/04

USPC .............. 340/10.4, 10.1; 455/41.1
See application file for complete search history.

(56) References Cited

U.S. PATENT DOCUMENTS

| | | | |
|---|---|---|---|
| 5,909,183 A * | 6/1999 | Borgstahl | G08C 19/28 340/10.51 |
| 2007/0188323 A1 | 8/2007 | Sinclair et al. | |
| 2008/0014989 A1 | 1/2008 | Sandegard et al. | |
| 2008/0195735 A1* | 8/2008 | Hodges | G06F 1/1626 709/227 |
| 2011/0070826 A1* | 3/2011 | Griffin | H04B 5/02 455/41.1 |
| 2011/0081923 A1 | 4/2011 | Forutanpour et al. | |

(Continued)

FOREIGN PATENT DOCUMENTS

| CN | 101491067 A | 7/2009 |
|---|---|---|
| CN | 102549574 A | 7/2012 |

(Continued)

OTHER PUBLICATIONS

Chinese Search Report, dated Oct. 26, 2016.

*Primary Examiner* — Edwin Holloway, III
(74) *Attorney, Agent, or Firm* — Cha & Reiter, LLC

(57) ABSTRACT

A method for performing data transmission/reception using Near Field Communication (NFC) in a terminal includes loading a preset data transmission/reception policy upon recognizing a target device capable of communication using NFC; acquiring at least one sensing information used to determine a particular data transmission/reception operation; and determining the particular data transmission/reception operation based on the loaded data transmission/reception policy and the acquired sensing information.

15 Claims, 3 Drawing Sheets

(56) References Cited

U.S. PATENT DOCUMENTS

| | | | |
|---|---|---|---|
| 2011/0163944 A1 | 7/2011 | Bilbrey et al. | |
| 2012/0135680 A1* | 5/2012 | Deluca ............ | H04M 1/274516 |
| | | | 455/41.1 |
| 2012/0187184 A1* | 7/2012 | Challa .............. | G06K 19/06112 |
| | | | 235/375 |
| 2012/0220221 A1* | 8/2012 | Moosavi ......... | H04M 1/274516 |
| | | | 455/41.1 |

FOREIGN PATENT DOCUMENTS

| | | |
|---|---|---|
| EP | 2 302 882 A1 | 3/2011 |
| WO | 2010/145618 A1 | 12/2010 |

\* cited by examiner

| P2P MODE | TX | APPLY ACTION LAID-DOWN STATE |
|---|---|---|
| | RX | TURNED-OVER STATE |
| | TX/RX | SHAKE ACTION STOOD-UP STATE |
| R/W MODE | TX | LAID-DOWN STATE |
| | RX | TURNED-OVER STATE |

| TX | APPLY ACTION LAID-DOWN STATE |
|---|---|
| RX | TURNED-OVER STATE |
| TX/RX | SHAKE ACTION STOOD-UP STATE |

APPARATUS AND METHOD FOR PROVIDING DATA TRANSMISSION/RECEPTION IN A TERMINAL USING NEAR FIELD COMMUNICATION

CLAIM OF PRIORITY

This application claims the benefit under 35 U.S.C. §119(a) from a Korean Patent Application filed in the Korean Intellectual Property Office on Sep. 14, 2012 and assigned Serial No. 10-2012-0102103, the entire disclosure of which is incorporated herein by reference.

BACKGROUND

Field of the Invention

The present disclosure relates generally to a data transmission/reception method and system, and more particularly, to a data transmission/reception method and a device equipped with Near Field Communication (NFC) technology.

Description of the Related Art

Near Field Communication (NFC) is a contactless communication standard for smartphones and other similar devices using a frequency band of 13.56 MHz to establish radio communication with each other within a distance of about 10 cm.

The NFC technology is compatible with International Organization for Standardization/International Electro technical Commission (ISO/IEC) 14443 cards, Felica tags and Mifare tags. Unlike Radio Frequency IDentification (RFID) supporting only the read function, the NFC technology further supports a write function and provides a higher security due to its short communication distance of 10 cm.

Due to these advantages, the NFC technology has been recently applied to a variety of terminals such as smart phones, for payment and data transmission/reception. The standard related to NFC technology specifies three function modes: a Reader/Writer (R/W) mode in which reading tags, smart posters and the like is possible, a Peer-to-Peer (P2P) mode in which data exchange between terminals is possible, and a Card Emulation mode in which a terminal may operate like a card.

In the P2P mode a bidirectional data transmission or one-way data transmission may be achieved. For example, the one-way data transmission may be achieved in which Uniform Resource Locator (URL) information of a web program being executed in one terminal may be transmitted to another terminal. Also, the bidirectional data transmission may be achieved in which, for example, business card information stored in both terminals may be exchanged with each other.

In operation, a user needs to determine or select whether to perform bidirectional data exchange or to perform one-way data transmission depending on the user's selection from a set menu, which may be a cumbersome and inconvenient for the user during operation.

SUMMARY

An aspect of the present invention is to address at least the above-mentioned problems and/or disadvantages and to provide at least the advantages described below. Accordingly, an aspect of exemplary embodiments of the present invention is to provide a method and apparatus for facilitating NFC-based data transmission.

In accordance with one aspect of the present invention, a method for performing data transmission/reception using Near Field Communication (NFC) in a terminal includes: loading a set data transmission/reception policy upon recognizing a target device capable of communication using NFC; acquiring at least one sensing information, by the terminal, used to determine a data transmission/reception operation; and determining a specific data transmission/reception operation that the terminal is to perform with the target device, based on the loaded data transmission/reception policy and the acquired sensing information.

In accordance with another aspect of the present invention, an apparatus for performing data transmission/reception using Near Field Communication (NFC) in a terminal includes: a communication unit for communicating with a target device using NFC; a memory for storing a predefined data transmission/reception policy; at least one sensor for acquiring sensing information relating to a state of the terminal; and a controller for determining a particular data transmission/reception operation that the terminal is to perform with the target device, based on the at least one sensing information acquired by the at least one sensor and the predefined data transmission/reception policy upon recognizing the target device.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

As described in the background, in the conventional method of transmitting and receiving data using NFC, the user must inconveniently determine and/or select whether to perform a transmission operate, perform a reception operation, or perform a transmission/reception operation during each operation.

Exemplary embodiments of the present invention provide a method and apparatus for allowing a user to simply achieve data transmission/reception without manually selecting transmission and reception operations. Specifically, according to the teachings of the present invention, a terminal may determine whether to perform a transmission operation, a reception operation, or a transmission/reception operation, based on the acquired sensing information and the set data transmission/reception policy.

Exemplary embodiments of the present invention will be described below with reference to the accompanying drawings.

Figure 1:
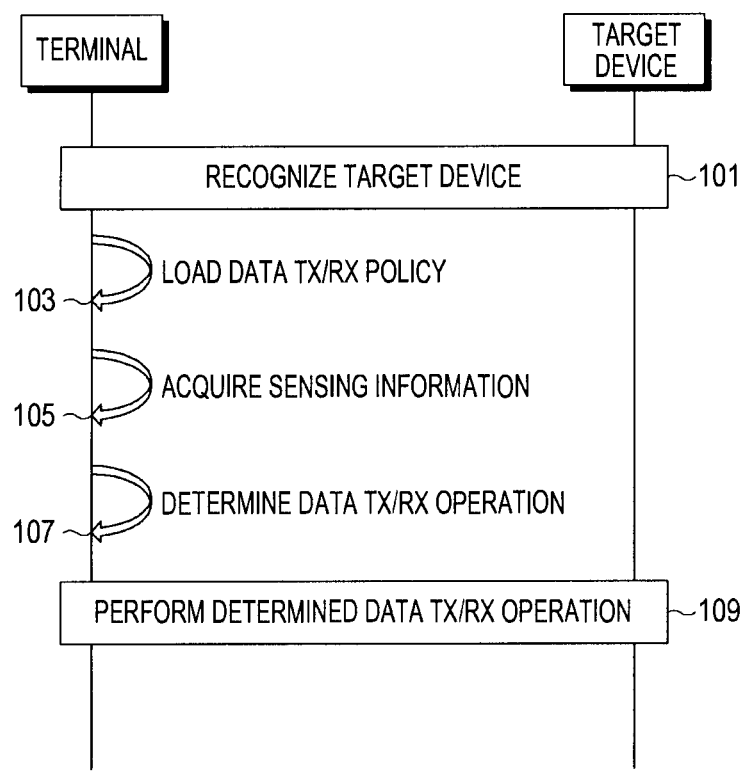
FIG. 1 illustrates the concept of a data transmission/reception method according to an embodiment of the present invention.

FIG. 1 illustrates the operation steps of a data transmission/reception method according to an embodiment of the present invention.

In step 101, a terminal recognizes a target device using NFC protocol. Here, the target device may be a portable terminal, a tag capable of NFC communication, a tablet, or any duplex device with NFC capability according exemplary embodiments of the present invention.

In step 103, the terminal loads a set data transmission/reception policy. The phrase 'loading a data transmission/reception policy' as used herein may be construed to include not only an operation of shifting a data transmission/reception policy to a specific component, but also an operation of simply referring to the contents of the data transmission/reception policy stored in a memory. The term 'data transmission/reception policy' refers to a policy used to determine any one of data transmission, reception, and transmission/reception operations depending on the state information of a terminal. Here, the term 'state information of a terminal' refers to information regarding a slope and a motion state of the terminal.

In step 105, the terminal acquires information by sensing its motion and sloped states.

In step 107, the terminal determines a data transmission/reception operation to perform. Specifically, the terminal determines to perform any one of data transmission, reception, and transmission/reception operations based on the set data transmission/reception policy in step 103 and the acquired data sensing information in step 105.

In step 109, based on the outcome from step 107, the terminal selectively performs any one of the data transmission, reception, and transmission/reception operations.

Accordingly, the user of a terminal does not need to manually select any operation when detecting another device during near-field communication.

Hereinafter, a data transmission/reception method according to an embodiment of the present invention will be described in more detail below with reference to the related drawings.

Figure 2:
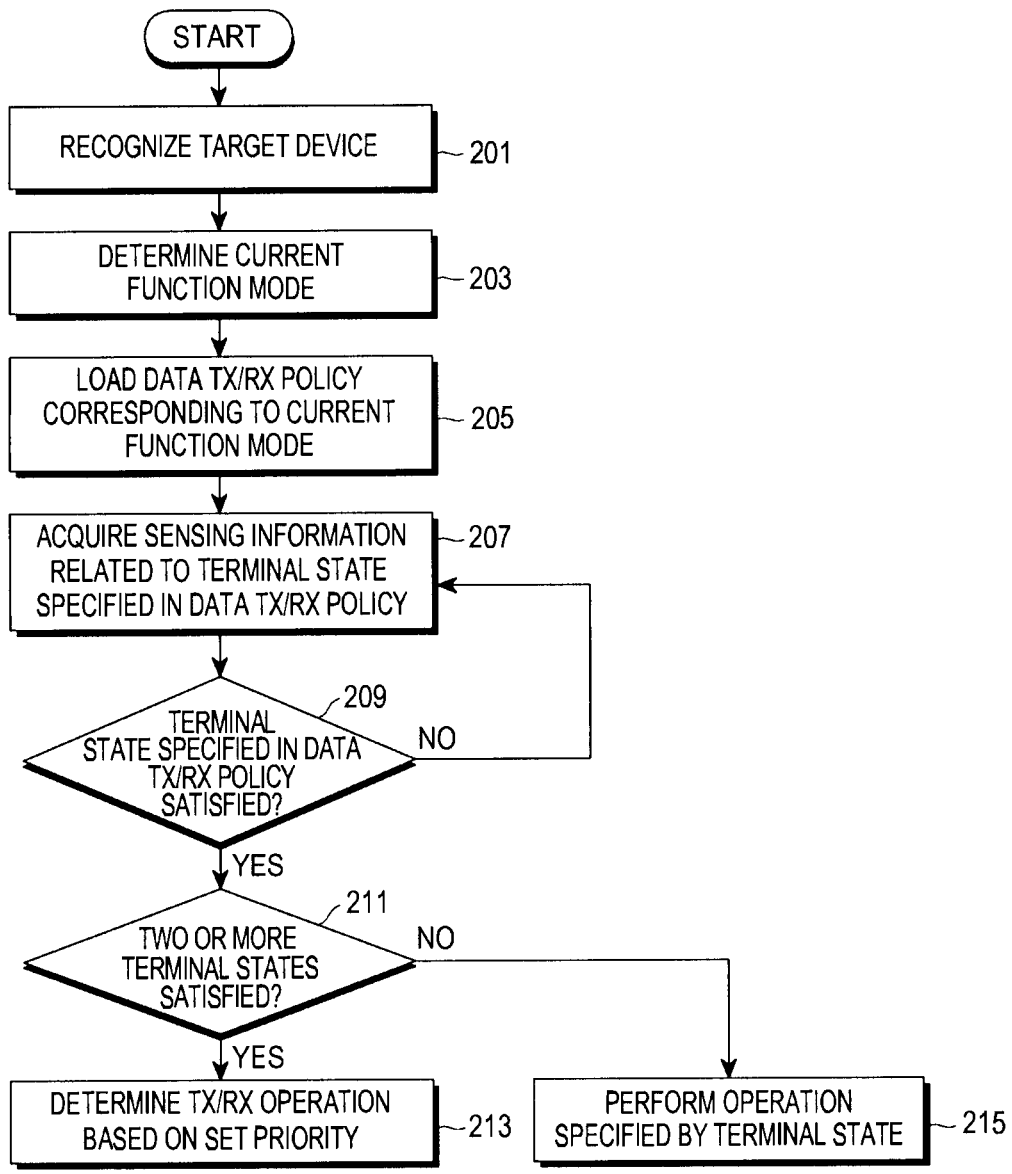
FIG. 2 is a flowchart illustrating a data transmission/reception method according to an embodiment of the present invention.

FIG. 2 is a flowchart illustrating a data transmission/reception method according to an embodiment of the present invention.

In step 201, a terminal recognizes a target device capable of communication using NFC.

In step 203, the terminal determines a currently set NFC function mode. Specifically, the terminal determines whether the currently set NFC function mode is a P2P mode or an R/W mode.

In step 205, the terminal loads a data transmission/reception policy corresponding to the currently set NFC function mode. For example, the terminal loads a data transmission/reception policy related to the P2P mode if the currently set NFC function mode is the P2P mode, and loads a data transmission/reception policy related to the R/W mode if the currently set NFC function mode is the R/W mode. The term 'loading' as used herein may include an operation of simply referring to the data transmission/reception policy stored in a memory.

In step 207, the terminal acquires sensing information related to a terminal state specified in the data transmission/reception policy. For example, if the terminal state specified in the data transmission/reception policy relates to a slope, the terminal may acquire only the sensing information relating to a slope state of the terminal. On the other hand, if the terminal state specified in the data transmission/reception policy relates to a slope and a motion, the terminal may acquire the sensing information relating to both the slope and motion of the terminal.

In step 209, the terminal determines whether the acquired sensing information satisfies at least one terminal state specified in the data transmission/reception policy, and proceeds to step 211 if the acquired sensing information satisfies at least one terminal state specified in the data transmission/reception policy.

In step 211, the terminal determines whether the acquired sensing information satisfies two or more terminal states specified in the data transmission/reception policy. The terminal proceeds to step 213 if the acquired sensing information satisfies two or more terminal states. Otherwise, the terminal proceeds to step 215.

In step 213 (for a case where the acquired sensing information satisfies two or more terminal states specified in the data transmission/reception policy), the terminal determines a data transmission/reception operation that the terminal will perform with a target device based on a preset priority.

In step 215 (for a case where the acquired sensing information satisfies only one terminal state specified in the data transmission/reception policy), the terminal performs an operation specified according to the terminal state specified in the data transmission/reception policy.

In an alternate embodiment, the terminal may determine a data transmission/reception operation based on the data transmission/reception policy regardless of the presently set NFC function mode. In this case, step 203 is optional, and the entire data transmission/reception policy will be loaded in step 205.

Hereinafter, the above exemplary process of determining a data transmission/reception operation using the data transmission/reception policy according to an embodiment of the present invention will be described in details with reference to the related drawings.

Figures 3A, 3B, 4:
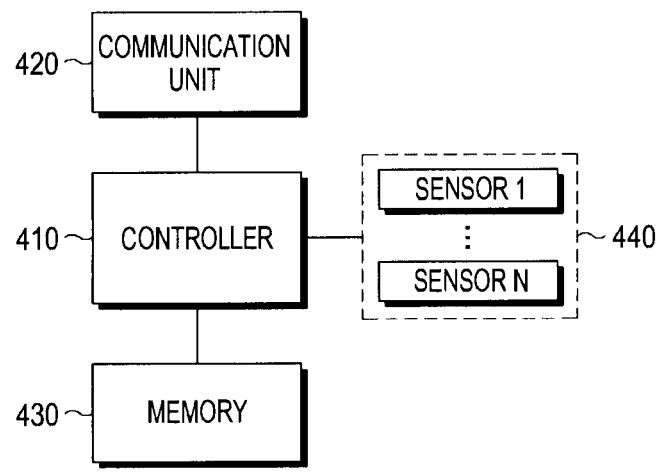
FIGS. 3A and 3B illustrate a data transmission/reception policy according to an embodiment of the present invention.
FIG. 4 is a block diagram illustrating a data transmission/reception apparatus according to an embodiment of the present invention.

FIGS. 3A and 3B illustrate a data transmission/reception policy according to an embodiment of the present invention.

The data transmission/reception policy may be classified depending on the NFC function mode as shown in FIG. 3A, and may also be specified regardless of the NFC function mode as shown in FIG. 3B.

More specifically, the data transmission/reception policy shown in FIG. 3A defines the state of a terminal according to motions (an apply action and a shake action) and/or slope state (a laid-down state, a turned-over state, and a stood-up state) of the terminal in the P2P mode. Note that when a display unit of the terminal is facing down, it is interpreted as "a laid-down state", when a display of the terminal is facing up, it is interpreted as "a turned-over state". In the R/W mode, the data transmission/reception policy specifies terminal states regarding slopes (a laid-down state and a turned-over state) of the terminal. In addition, the data transmission/reception policy specifies an operation will be performed with a target device in each of the terminal states.

In alternate embodiment, the data transmission/reception policy shown in FIG. 3B specifies terminal states according to motions (an apply action and a shake action) and slopes (a laid-down state, a turned-over state, and a stood-up state) of the terminal regardless of the NFC function mode. In addition, the terminal specifies an operation it will perform with a target device in each of the terminal states.

It will be assumed that the currently set NFC function mode is the P2P mode when the data transmission/reception policy is specified as shown in FIG. 3A. In this case, the terminal acquires sensing information based on which it may compare the terminal states specified in the P2P mode with its own current state. For example, because the motions and slopes of the terminal are specified in the P2P mode, the terminal may determine its motion based on the sensing information acquired from an acceleration sensor, and determine its slope based on the sensing information acquired from a gyro sensor.

After analyzing the sensing information, if it is determined that the terminal is laid down, the terminal performs a transmission operation with the target device based on the data transmission/reception policy, as shown in FIG. 3A.

After analyzing the sensing information, if it is determined that the terminal is being shaken while it is laid down, the terminal needs to determine whether to perform a transmission operation, or whether to perform a transmission/reception operation. These decisions may be achieved based on a preset priority. For example, if the transmission/reception operation is given a higher priority than the transmission operation, the terminal may determine to perform the transmission/reception operation.

Meanwhile, in an alternate embodiment, it will be assumed that the currently set NFC function mode is the R/W mode. In this case, the terminal acquires sensing information based on which it may compare the terminal states specified in the R/W mode with its own current state. For example, because the terminal states regarding only the slopes of the terminal are specified in the R/W mode, the terminal may determine its slope based on the sensing information acquired from a gyro sensor. After analyzing the sensing information, if it is determined that the terminal is laid down, the terminal performs a transmission operation with the target device according to the data transmission/reception procedure specified in FIG. 3B. If the terminal is determined to be turned-over state, the terminal performs a reception operation with the target device.

Hereinafter, a data transmission/reception apparatus according to an embodiment of the present invention will be described below with reference to the related drawings.

FIG. 4 is a block diagram illustrating a data transmission/reception apparatus according to an embodiment of the present invention.

Referring to FIG. 4, the data transmission/reception apparatus includes a controller 410, a communication unit 420, a memory 430, and a sensor unit 440.

Upon recognizing a target device capable of communication using NFC, the controller 410 determines a data transmission/reception operation that it will perform with the target device based on at least one sensing information acquired by the sensor unit 440 and a preset data transmission/reception policy. The target device may be recognized based on the information received from the communication unit 420.

The controller 410 may determine a currently set NFC function mode. For example, if the data transmission/reception policy is specified according to the P2P mode and the R/W mode, and the currently set NFC function mode is the P2P mode, the controller 410 may refer to the data transmission/reception policy corresponding only to the P2P mode.

When determining a data transmission/reception operation, the controller 410 may acquire only the sensing information used to determine whether the current terminal state satisfies the terminal states specified in the data transmission/reception policy. To this end, the terminal uses an acceleration sensor 440 and a gyro sensor 440.

If the current terminal state satisfies any one of the terminal states specified in the data transmission/reception policy based on at least one sensing information acquired from the sensor unit 440, the controller 410 may perform an operation specified according to the terminal state specified in the data transmission/reception policy. On the other hand, after analyzing the at least one sensing information acquired from the sensor unit 440, if the current state satisfies two or more terminal states specified in the data transmission/reception policy, the controller 410 may perform an operation specified in two or more terminal states according to a preset priority scheme.

The communication unit 420 performs communication with another terminal or a tag using NFC. Upon recognizing the target terminal or the tag capable of NFC communication, the communication unit 420 informs the controller 410 of the recognition. The communication unit 420 delivers data received from the target device to the controller 410 or the memory 430. If the controller 410 determines to perform only the transmission operation, the data received from the target device is discarded without being delivered from the communication unit 420 to the controller 410 or the memory 430.

The memory 430 stores the data transmission/reception policy. The data transmission/reception policy may be predetermined or modified by the designers or the users.

The sensor unit 440, under control of the controller 410, acquires sensing information and delivers the acquired sensing information to the controller 410. The sensor unit 440, under control of the controller 410, may deliver, to the controller 410, sensing information measured for a set time period. The sensor unit 440 may include at least one sensor for acquiring sensing information used to determine a terminal state for at least one of a motion and a slope of the terminal. For example, the sensor unit 440 may include a gyro sensor to acquire sensing information used to determine a slop state of the terminal. The sensor unit 440 may further include an acceleration sensor to acquire sensing information used to determine a motion state of the terminal.

As is apparent from the foregoing description, the process of selecting a data transmission/reception operation by a user is not required, thus making it possible to perform the data transmission/reception operation easily and quickly.

The above-described embodiments of the present invention may be implemented in a variety of ways. For example, the embodiments of the present invention may be implemented using hardware, software, or a combination thereof. When implemented with software, the embodiments of the present invention may be implemented with the software that is executed in one or more processors employing a variety of Operating Systems (OSs) or platforms. In addition, the software may be created using any one of multiple appropriate programming languages, and may be compiled into executable machine code or intermediate code which may be executed in a framework or a virtual machine.

In addition, when embodiments of the present invention are implemented in one or more processors, they may be implemented with a processor-readable medium (for example, a memory, a floppy disk, a hard disk, a Compact Disk (CD), an optical disk, a magnetic tape or the like) recording one or more programs for performing the method of implementing the above-described various embodiments of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing data transmission/reception using Near Field Communication (NFC) in a terminal, comprising:
   determining an NFC mode of the terminal, wherein the NFC mode is one of a peer-to-peer mode and a reader/writer mode, upon recognizing a target device;
   selecting a data transmission/reception policy associated with the determined NFC mode of the terminal between a first data transmission/reception policy associated with the peer-to-peer mode and a second data transmission/reception policy associated with the reader/writer mode;
   loading the selected data transmission/reception policy associated with the determined NFC mode of the terminal;
   acquiring at least one sensing information related to a state of the terminal as specified in the loaded data transmission/reception policy, wherein acquiring further comprises:
   acquiring the at least one sensing information related to a state of the terminal as specified in the first data transmission/reception policy, from a combination of at least one sensor if the NFC mode is the peer-to-peer mode, and
   acquiring the at least one sensing information related to a state of the terminal as specified in the second data transmission/reception policy, from another combination of at least one sensor if the NFC mode is the reader/writer mode; and
   determining a particular data transmission/reception operation for performing with the target device based on the loaded data transmission/reception policy and the acquired at least one sensing information,
   wherein the first data transmission/reception policy and the second data transmission/reception policy specify the particular data transmission/reception operation corresponding to the state of the terminal and the first data transmission/reception policy and the second data transmission/reception policy are different from each other.

2. The method of claim 1, wherein the acquiring comprises acquiring the at least one sensing information that satisfies a terminal state specified in the loaded data transmission/reception policy.

3. The method of claim 1, wherein the determining the particular data transmission/reception operation for performing with the target device comprises analyzing the acquired at least one sensing information and determining whether a current terminal state satisfies at least one terminal state specified in the loaded data transmission/reception policy.

4. The method of claim 3, wherein, if the current terminal state satisfies at least one terminal state specified in the loaded data transmission/reception policy, performing an operation corresponding to the at least one terminal state specified in the loaded data transmission/reception policy.

5. The method of claim 1, wherein the determining the particular data transmission/reception operation for performing with the target device comprises analyzing the acquired at least one sensing information and determining whether a current terminal state satisfies two or more terminal states specified in the loaded data transmission/reception policy.

6. The method of claim 5, wherein, if the current terminal state satisfies two or more terminal states specified in the loaded data transmission/reception policy, performing an operation corresponding to one of the two or more terminal states specified in the loaded data transmission/reception policy based on a preset priority scheme.

7. A terminal for performing data transmission/reception using Near Field Communication (NFC), comprising:
   a communication unit for communicating with a target device;
   a memory for storing predetermined data transmission/reception policies;
   at least one sensor for acquiring sensing information relating to a state of the terminal; and
   a controller configured to:
   determine an NFC mode of the terminal, wherein the NFC mode is one of a peer-to-peer mode and a reader/writer mode, upon recognizing a target device;
   selecting a data transmission/reception policy associated with the determined NFC mode of the terminal between a first data transmission/reception policy associated with the peer-to-peer mode and a second data transmission/reception policy associated with the reader/writer mode;
   load the selected data transmission/reception policy associated with the determined NFC mode of the terminal;
   acquire at least one sensing information related to a state of the terminal as specified in the loaded data transmission/reception policy, wherein acquiring further comprises:
   acquiring the at least one sensing information related to a state of the terminal as specified in the first data transmission/reception policy, from a combination of at least one sensor if the NFC mode is the peer-to-peer mode, and
   acquiring the at least one sensing information related to a state of the terminal as specified in the second data transmission/reception policy, from another combination of at least one sensor if the NFC mode is the reader/writer mode; and
   determine a particular data transmission/reception operation for performing with the target device based on the loaded data transmission/reception policy and the acquired at least one sensing information,
   wherein the first data transmission/reception policy and the second data transmission/reception policy specify the particular data transmission/reception operation corresponding to the state of the terminal and the first data transmission/reception policy and the second data transmission/reception policy are different from each other.

8. The terminal of claim 7, wherein the at least one sensor acquires the sensing information that satisfies a terminal state specified in the data transmission/reception policy corresponding to the determined NFC function mode.

9. The terminal of claim 7, wherein the controller analyzes the acquired at least one sensing information and performs an operation corresponding to a relevant terminal state when a current terminal state satisfies at least one terminal state specified in the data transmission/reception policy.

10. The terminal of claim 7, wherein the controller analyzes the acquire at least one sensing information and, if a current terminal state satisfies two or more terminal states specified in the data transmission/reception policy, the controller performs an operation corresponding to one of the two or more terminal states specified in the predetermined data transmission/reception policy based on a preset priority scheme.

11. The method of claim 1, wherein the state of the terminal comprises at least one of a slope state of the terminal and a motion state of the terminal.

12. The terminal of claim 7, wherein the state of the terminal comprises at least one of a slope state of the terminal and a motion state of the terminal.

13. The method of claim 1, wherein the acquiring the at least one sensing information related to the state of the terminal as specified in the loaded data transmission/reception policy further comprises:
  determining whether to acquire motion state information based on whether the mode is the peer-to-peer mode or the reader/writer mode.

14. The method of claim 13, wherein determining whether to acquire motion state information comprises acquiring motion state information if the NFC mode is the peer-to-peer mode.

15. The method of claim 14, wherein the motion state information comprises a shake action.

* * * * *